Figure 3:
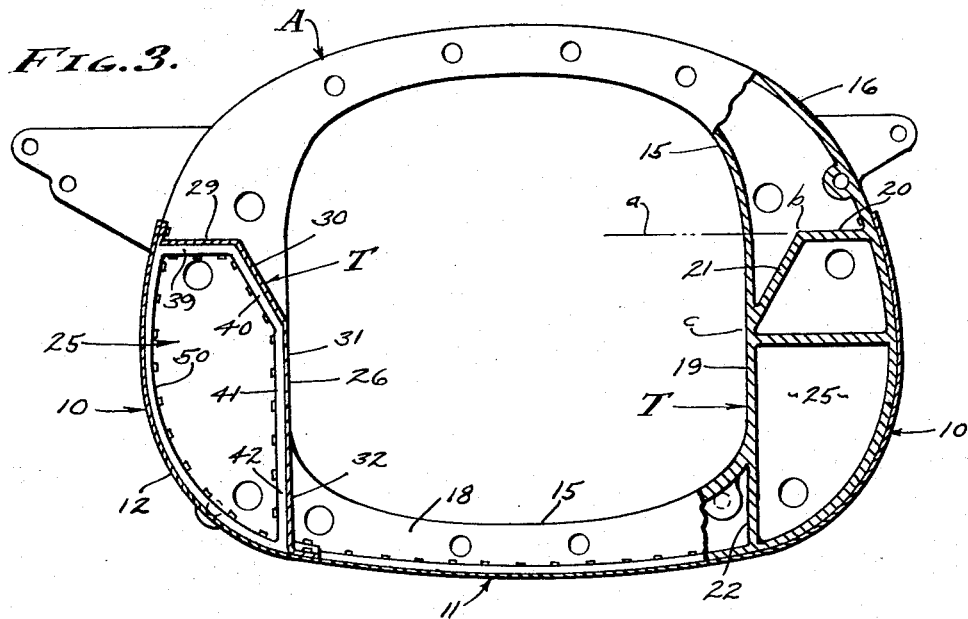

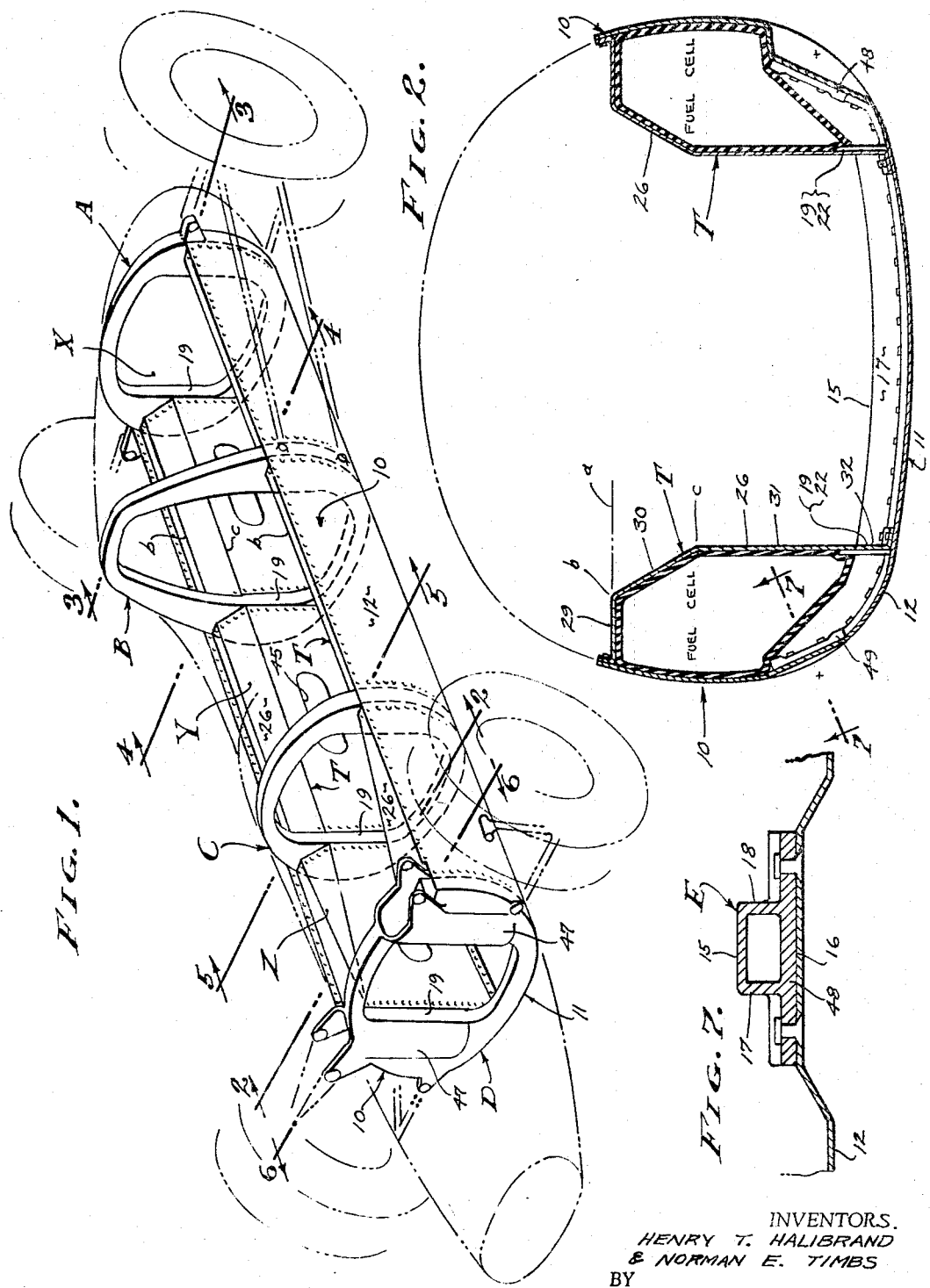

Dec. 20, 1966  H. T. HALIBRAND ETAL  3,292,968
RACE CAR CHASSIS
Filed June 1, 1964  3 Sheets-Sheet 2

INVENTORS.
HENRY T. HALIBRAND
& NORMAN E. TIMBS
BY
AGENT

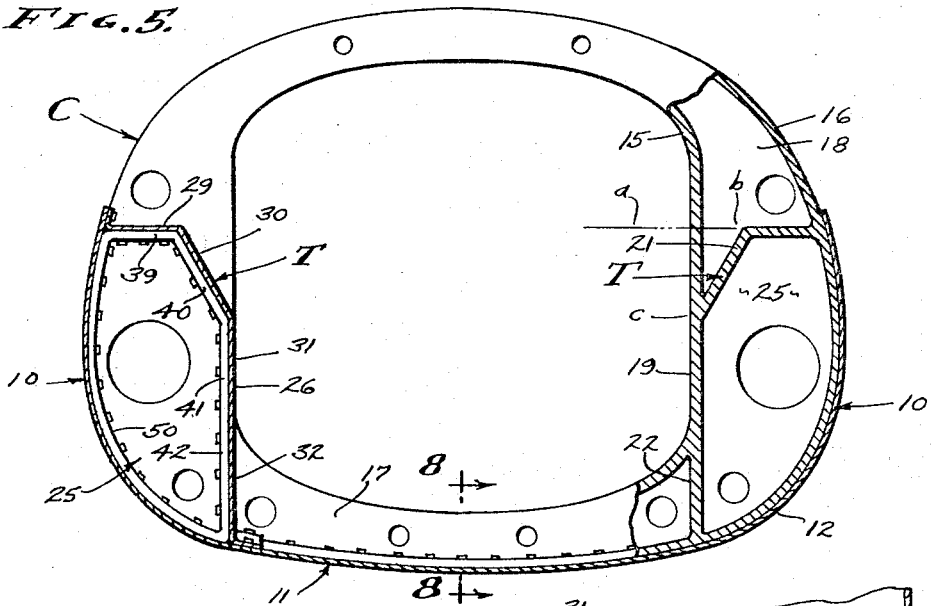
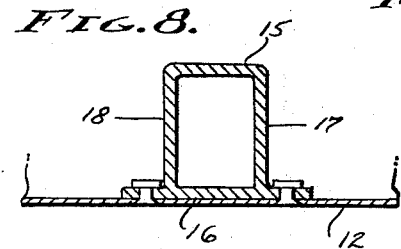
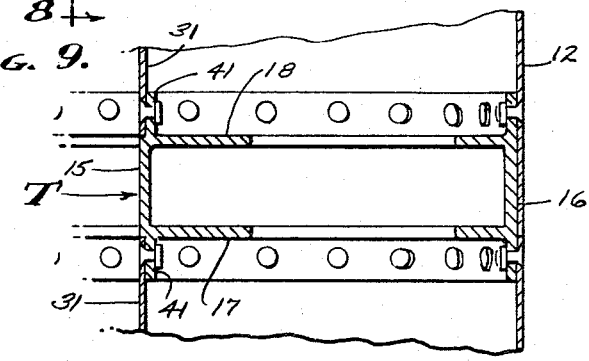
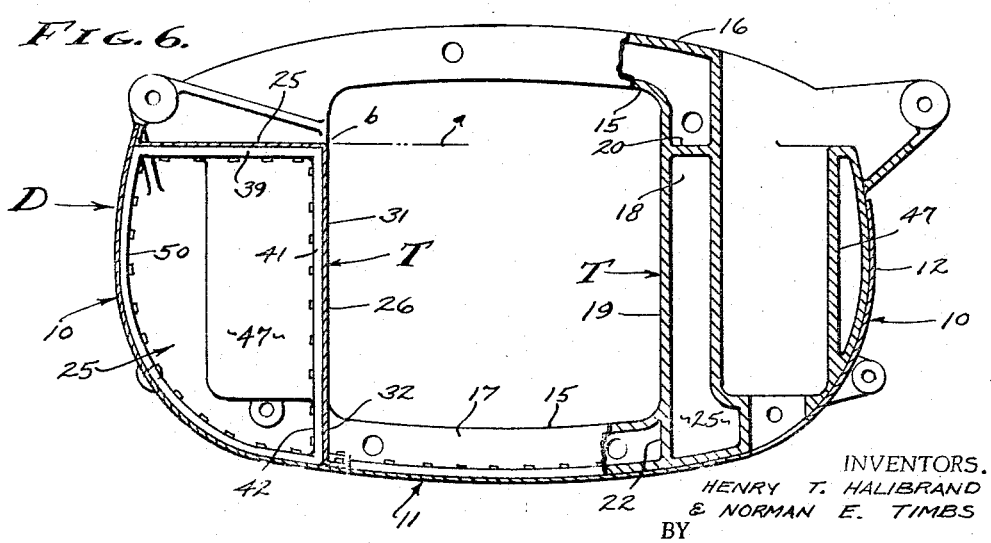

United States Patent Office 3,292,968
Patented Dec. 20, 1966

3,292,968
RACE CAR CHASSIS
Henry T. Halibrand, 6469 Nancy St., Los Angeles, Calif. 90045, and Norman E. Timbs, 9652 Langdon Ave., Sepulveda, Calif. 91343
Filed June 1, 1964, Ser. No. 371,552
8 Claims. (Cl. 296—28)

This invention relates to a vehicle chassis and is particularly concerned with high-performance race cars wherein strength accompanied by light-weight is of prime importance. The general object of this invention is to produce an ideal chassis wherein all four wheels are connected with a structure which is rigid as to bending and torsion loads, and which will neither sag nor twist.

The race car chassis has experienced an evolution which places present day race cars in a category entirely alone and by themselves. These machines are designed to perform under varied conditions and for example are designed to circle race tracks which are exclusively devoted to left-hand turns, in which case the weights and balance of the cars are adjusted to be best adapted to such a track. Also, these machines are designed to encounter tracks and/or roads which have both right and left-hand turns. In any case, however, rigidity and lightness is essential, it being imperative that these two essentials accompany each other.

The ordinary present day race car is of the space-frame type, usually divided into three bays, but is not a complete structure because the top frame of the central bay (the one through which the driver's body protrudes) is not triangulated, although such frames are very neatly braced. These frames could be triangulated externally, but only at the expense of considerably increased body width. Consisting, in effect, of four longitudinal members supported by four bulkheads, the usual space-frame chassis is made up of mild steel tube. The scuttle bulkhead is usually of the "perforated hoop" type and consists of two tubular hoops linked by stressed sheet steel. A similar type of bulkhead is used at the extreme rear. Front suspension loads are transferred through upper and lower wishbones pivoted on the chassis. At the rear is a system of twin transverse links and parallel radius arms. Springing at the front and rear is by usual coil and damper units.

Perhaps the most significant of all recent developments over the space-frame chassis is the semi-monocoque chassis structure. The semi-monocoque chassis has roughly the same features as the space-frame chassis above referred to but the lower half of the bodywork of the semi-monocoque chassis also serves as a load-carrying member. There is an inner skin spaced back several inches from the outer panels, forming a pair of large tubes running the length of the car. The front and rear suspensions bolt onto light-gauge sheet steel bulkheads that plug the ends of the load-carrying "canoe." Behind the driver's backrest, the "frame" dips to clear the engine's cylinderheads and this potentially weaker section is braced by the engine and transmission unit, which is tied thereto by mounts to form a strut between the body and the rear bulkhead. Another strengthening member is the cowl-hoop that holds the instruments. Within the load-carrying sides of the body are fuel tanks, inserted through doors provided for that purpose and connected to a central filler pipe in the cowl.

With the race car chassis, it is necessary to support all components and occupants and to absorb all loads without failure. Thus, its chief purpose is to provide adequate mountings for all components involved including front and rear suspension, drive, brakes, steering, engine and/or gear box, fuel tanks, seating, pedals and other controls, radiator and coolers, battery, and any and all other necessary accessories.

An object of this invention is to provide a true and completely monocoque chassis for a vehicle such as a race car or the like, wherein a virtually rigid nonbendable and nontwistable structure of minimum weight is the result.

Another object of this invention is to provide a monocoque chassis structure of the character referred to wherein simple bends and/or curvature is employed to the exclusion of undesirable compound curvature and/or bends and to the end that maximum strength is gained from skin stress.

It is still another object of this invention to provide a monocoque chassis structure of the character referred to wherein a "canoe" is established and which is opened upwardly through its length for the reception of necessary components and the occupant and which is reinforced by uninterrupted tubular rails, providing strength as to both bending and torsion.

It is also another object of this invention to provide a monocoque chassis structure of the character referred to wherein a "canoe" is established and which is divided into useful bays adjoined at formers through which continuity of the aforementioned tubular rails is transferred, and to further provide light-weight formers of tubular cross section, in themselves, through which said continuity of the tubular rails is transferred.

The various objects and features of this invention will be fully understood from the following detailed description of the typical preferred form and application thereof, throughout which description reference is made to the accompanying drawings, in which:

FIG. 1 is a perspective view of the chassis structure provided by the present invention showing the "canoe" thereof in full lines and illustrating the necessary shape and other components of the car in phantom lines.

FIGS. 2 through 6 inclusive are enlarged sectional views each taken substantially as indicated by lines 2—2, 3—3, 4—4, 5—5, and 6—6 on FIG. 1.

Figure 4:
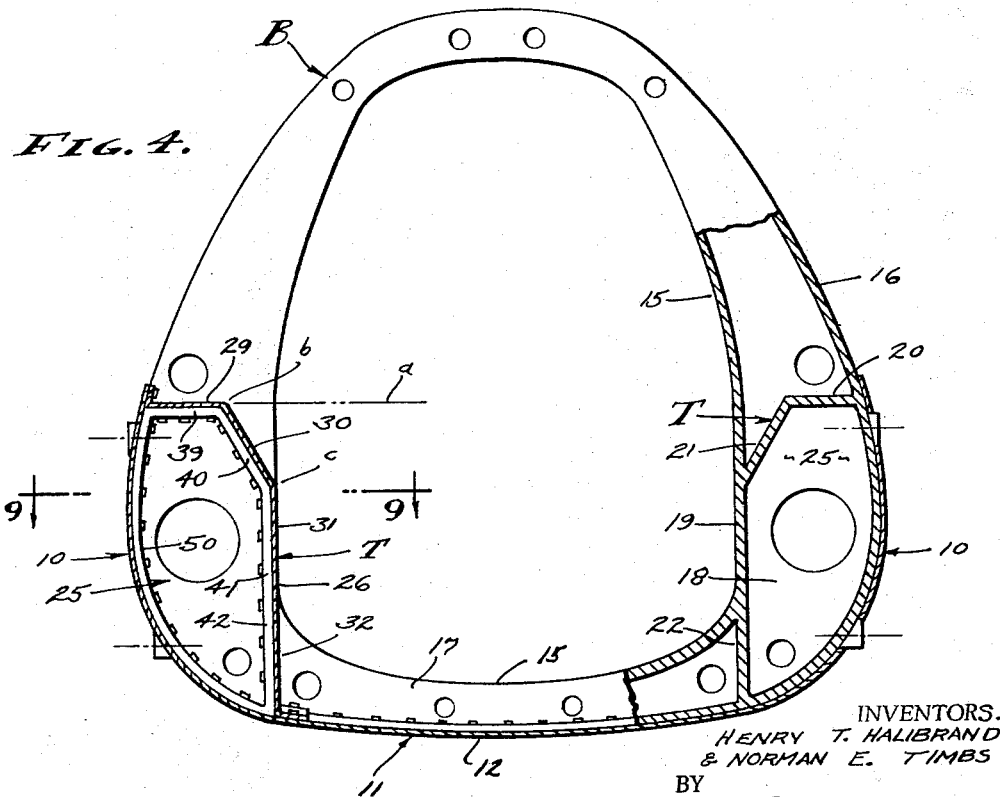

FIGS. 7, 8, and 9 are fragmentary sectional views taken substantially as indicated by lines 7—7, 8—8, and 9—9 on FIGS. 2, 5 and 4 respectively.

The chassis of the present invention is a monocoque structure that is characteristically a "canoe" shape. Although this shape may resemble some prior art structures of the type under consideration, namely semi-monocoque structures, it has a unique configuration in its former and stressed skin relationship and in its absolutely straight fore and aft body lines. That is, the formers are unique and the present chassis when viewed in cross section is curved but the body when viewed longitudinally is perfectly straight. Further, the characteristic "canoe" is open-topped as well as being open-ended, and it is necessarily divided into bays of separate utility; there being an engine bay X, an occupant bay Y, and a controls bay Z. The three (or more) bays are defined and/or adjoin and continue one into the other at formers A, B, C, D and E (working from the rear forwardly). These formers, as later described establish the cross sectional curvature and/or configuration of the stressed skin involved and they also establish the configuration and continuity of torsion tubes T which extend co-extensively with the chassis structure. As shown, each former A, B, C, D, and E has features incorporated therein for the accommodation of and/or mounting of the various components required in the complete car.

In accordance with the preferred form of the invention the breadth of the chassis is uniform throughout its length characterized by its outerskin 12 with sides 10 curved and faired into a rounded bottom 11. In this case the sides 10 and any and all longitudinally and horizontally disposed body lines are absolutely straight and parallel, said sides 10 and bottom 11 being longitudinally straight and contoured in cross section only. Thus, the sides 10 and bottom 11 are readily formed of a single integral sheet of material contoured in cross section as shown as by means of a suitable form rolling method or the like. It is to be understood that compound curvature such as caused by adding longitudinal curves can be employed, but only with the sacrificing of strengths.

As an equivalent and in accordance with the invention the breadth of the chassis can vary by diverging throughout its length, with divergent sides curved as above described and faired into a widening and flattened (partially at least) bottom. In this instance, the sides and any and all longitudinal and horizontally disposed body lines thereof are absolutely straight, but not parallel with the corresponding body lines of the opposite side of the chassis. Thus, it is feasible to form the "canoe"-shaped chassis with substantially parallel sides but with a widening cross section.

In accordance with the preferred form of the present invention the formers A, B, C, D, and E are essentially alike, each being of identical cross section as it is related to the "canoe" shaped cross section of the chassis. Therefore, according to the lofted lines of the chassis the contours of the various formers are identical with each other up to and including the uppermost waterline $a$ of the "canoe." Since the cross sectional contour can vary widely as circumstances require, no particular reference need be made to other waterline levels. However, it is significant that the cross sectional configuration is an oval characterized by a flattened bottom, in which case the lofted buttock lines show a flatly molded underbody. Thus, it is the underbody and side contours of the formers A–E which are identical up to the waterline $a$ where the chassis opens upwardly for the reception of components and the occupant.

Each former A, B, C, and D is a tubular hoop, preferably erected in a vertically disposed plane extending transversely of the chassis. The said formers A–D and also the former E are identical insofar as the bottom and side contours are concerned, and the formers A–D are similar in all other respects being complete 360° hoops. Generally, a description of one hoop-shaped former will suffice for all as follows: As shown, the formers are of tubular cross section having inner and outer walls 15 and 16 and having fore and aft walls 17 and 18. The latter walls are preferably flat and parallel with each other and each is disposed vertically. The outer wall 16 follows the specified contour of the underbody bottom 11 and sides 10, and it continues upwardly and transversely to join integrally at opposite sides of the former. The inner wall 15 is spaced inwardly from the outer wall 16 and is a continuous wall. The said walls 15–18 can be fabricated in various ways, it being preferred that they be integrally formed as by casting. Thus, the formers A–D (and E) are advantageously cast of light-weight metal such as magnesium or the like.

From the foregoing, it will be apparent that the formers A–E establish frames that occupy space extended inwardly from sides 10 and bottom 11. In accordance with the invention, the portions of the inner walls 15 which are juxtapositioned to the sides 11 are equally spaced from said sides and are all disposed in a common plane. It is preferred that the plane of disposition be vertical and parallel to the center of the chassis. As a result, the inner walls 15 of the formers present flat vertically disposed plates 19 in a common plane and each of which fairs into its continuous 360° inner wall 15. As best illustrated in FIG. 1, however, the plane of the plates 19 at the foremost former D are farther inboard for purposes of bracing the front suspension, which modifies the straightness, so to speak, of the inner skin hereinafter described. Thus, said common plane of the plates 19, at opposite sides 10 of the chassis, can be placed as is required and modified as shown, so as to extend from former to former.

At the uppermost level of the "canoe"-shaped chassis and preferably at the waterline $a$ each former A–D is provided with a plate 20 that extends inwardly from the outer wall 16. In accordance with the invention the plates 20 are all disposed in a common plane, preferably horizontally at both sides 10, and essentially the plates 20 extend inwardly to join the above described plates 19. However, for purposes of clearing other components of the car the plates 19 extend equidistantly to an upper shoulder point $b$ spaced outboard from the plane of the plates 19, at which point there is an intermediate plate 21 at each former and each of which extends inwardly and downwardly to join the plate 19 at a lower shoulder point $c$. In practice, the plates 21 at one side of the chassis are all in a common plane except for the foremost former D which is not necessarily modified by inclusion of the said plates 21 and which former includes only the plates 19 and 20.

At the lowermost level of the "canoe"-shaped chassis there is a plate 22 at each former A–E, each of said plates 22 forming a continuation of a plate 19. Therefore, in the case illustrated, the plates 22 are vertically disposed and depend from the plate 19 and join to the outer wall 16 at the bottom 11. In accordance with and a most significant feature of the present invention is that the above described plates 19, 20, 21, and 22 are not only disposed in longitudinally extended planes, but each plate extends between the fore and aft walls 17 and 18 of the tubular hoop-shaped formers A–E. Thus, the plates 20, 21, and 22 extend between the walls 17 and 18 within the hollow and tubular frame members established by the formers, thereby creating a box section frame 25 out of sight and buried within the tubular confines of each former. In practice, the formers being cast makes possible the integrated formation of the frames 25 with the formers A–D (and E) through the homogeneous pouring of the same from a body of molten material.

In accordance with the invention, an inner skin 26 is provided and which couples together with the box section frames 25 to establish a continuous tubular rail co-extensive with the longitudinal extent of the outer skin 12. The inner skin 26 is sectional and extends between the formers A–D each section of inner skin having portions 29, 30, 31 and 32 corresponding with the plates 19, 20, 21, and 22 respectively. That is, the said portions of the inner skin are disposed in planes coincidental with their respective plates. To this end, and in order to provide for said coupled engagement between the box section frames 25 and sections of skin 26, each frame is provided with flanged extensions 39, 40, 41, and 42 of the said respective plates 19, 20, 21, and 22. The said flanged extensions project from both the fore and aft walls 17 and 18 of the formers (with the obvious exception of the end formers A and D) and to the end that the inner skin sections are readily attached to the formers.

The inner skin is attached to the outer skin 12 at both its upper and lower margins, the upper margin being provided with an upturned flange to lie adjacent the side 10 and the lower margin being provided with an inturned flange to lie against the bottom 11. Various methods of fastening can be employed depending upon the materials used in forming these skins 12 and 26, and in the case illustrated rivet type fasteners are employed. In addition to the flanges above described each frame has fore and aft flanges 50 that lie at the contour of the outer skin and to which said skin is secured by open riveting methods. Further, by provision of hand holes 45 in the inner skin 26 the riveting at all flanges is easily reached and to the end that blind fastening is virtually avoided.

The formers A and B are coupled together by the skins 12 and 26, these two formers being equipped with features for mounting the rear suspension, engine, and drive, etc., as shown. It will be apparent how suitable ears and/or lugs and various anchor points can be provided in the fabrication of the formers A and B.

The formers C and D are coupled together by the skins 12 and 26, these two formers being equipped with features for mounting the front suspension, steering, pedals and other controls, etc., as shown. For instance, and as shown, there is a vertically disposed spring housing 47 at either side of the frame D, with suitable anchor points for pivotal mounting of the upper and lower wishbones. Again, it will be apparent how suitable ears and/or lugs and various anchor points can be provided in the fabrication of the formers C and D.

The frame E is especially provided for mounting of the front suspension and extends transversely of the bottom 11 so as to provide a mounting pad 48 at opposite sides of the chassis for pivotally anchoring the rearmost legs of the lower wishbones. Therefore, the frame E is positioned between the formers C and D and is confined to the bottom 11, and includes but one plate (at each side) which may be termed the plate 22.

The formers B and C are spaced as shown and are coupled together by the skins 12 and 26 to form the occupant seating bay of the chassis.

The car chassis hereinabove described is a monocoque structure that carries formers for mounting of the various components of the car, and wherein the formers A–E cooperatively couple the inner and outer skins 12 and 26. As is pointed out at the outset of this specification, the purpose of a car chassis is to connect and/or support all components that are necessary in a finished car, and to this end the formers A–E are the heavier structural members which receive the concentrated loads and distribute the loads into the monocoque structure. To this end, each former A–D is a rigid structural hoop of tubular cross section provided with lightening holes as shown resulting from core openings which are necessary in order to facilitate casting of the tube configuration. Further, each former A–D includes a box section frame 25 at each side thereof, each frame 25 being a complete structural unit in itself. Thus, a single integral and uninterrupted outer skin 12 is applied over the formers A–E, and inner skins 26 are applied in sections to establish continuations of the said box section frames 25. As a result, the said box section frames 25 are joined together by the two skins 12 and 26 so as to establish a continuous side rail at each side of the chassis. As is clearly illustrated, the respective plates and inner skin sections are flat and coplanar with adjoining bend lines disposed longitudinally, there being no transverse or compounding curvature. Similarly, the outer skin is contoured exclusively on longitudinally disposed bend lines, there being no compounded curvatures.

From the foregoing it will be seen that the chassis is an open-sided (top opening) and open ended "canoe"-shaped structure of monocoque design wherein the formers A–E are rigid members which although interposed throughout the monocoque structure provide the highly desirable continuity therethrough. That is, the outwardly apparent interrupted character of the formers A–E is changed by the inclusion therein of the box section frames 25 which are coupled into continuous rail structures by means of the inner skin sections. Therefore, the resulting structure is composed of continuous tubular side rails of beam configuration and each of which is torsionally stable. And, the resulting structure is composed of two opposite and continuous tubular side rails tied together by the uninterrupted bottom 11 transmitting transverse shear loads between the side rails. It becomes apparent then that the straight uninterrupted side rails joined by the bottom in shear and with the open side of the "canoe" tied together by the rigid tubular formers, provides an extremely light-weight chassis which rigidly resists deflections such as would result from the imposition of bending and torsion loads.

Having described only a typical preferred form and application of our invention, we do not wish to be limited or restricted to the specific details herein set forth, but wish to reserve to ourselves any modifications or variations that may appear to those skilled in the art and fall within the scope of the following claims.

Having described our invention, we claim:

1. A stressed skin car chassis comprising, an elongate cross sectionally contoured and substantially continuous outer skin, more than two rigid transversely disposed formers and at least one intermediate tubular cross sectioned former continuously coextensive transversely within and fastened to the outer skin, said intermediate former having an integral box-section extended longitudinally therethrough, and a sectional inner skin interrupted by the intermediate former and with its end margins fastened to the said longitudinally extended box-section of the intermediate former and extending between the formers and with its opposite side margins fastened to the outer skin establishing a continuous box-section rail extending through said intermediate former.

2. A stressed skin car chassis comprising, an elongate cross sectionally contoured and substantially continuous outer skin, more than two rigid transversely disposed formers and at least one intermediate tubular cross sectioned former within and fastened to the outer skin, said intermediate former having an integral box-section at each opposite side of the chassis and extending longitudinally therethrough, and a sectional inner skin at each opposite side of the chassis and each of which is interrupted by an intermediate former and fastened to a box-section thereof and extending between the formers and with its opposite side margins fastened to the outer skin establishing a continuous box-section rail extending through said intermediate former at each opposite side of the chassis.

3. A stressed skin car chassis comprising, an elongate cross sectionally contoured and substantially continuous outer skin, more than two longitudinally spaced and rigid transversely disposed formers and at least one intermediate tubular cross sectioned former continuously coextensive transversely within and fastened to the outer skin, said intermediate former having an integral box-section extended longitudinally therethrough, and a sectionally elongate inner skin with its opposite side margins fastened to the outer skin and interruped by the intermediate former and with its separated end margins fastened to the said longitudinally extended box-section of the intermediate former and extending between adjacently spaced formers establishing a continuous box-section rail extending through said intermediate formers.

4. A stressed skin car chassis comprising, an elongate cross sectionally contoured outer skin, more than two longitudinally spaced and rigid transversely disposed formers and at least one intermediate tubular cross sectioned former within and fastened to the outer skin, said intermediate former having an integral box-section at each opposite side of the chassis and extending longitudinally therethrough, and a sectionally elongate inner skin at each opposite side of the chassis and with its opposite side margins fastened to the outer skin and interrupted by the intermediate former and with its separated end margins fastened to the box-section and extending between and fastened to adjacently spaced formers establishing a continuous box-section rail extending through said intermediate former at each opposite side of the chassis.

5. A stressed skin car chassis comprising, an elongate cross sectionally contoured and substantially continuous outer skin, more than two rigid longitudinally spaced and transversely disposed tubular cross sectioned formers continuously coextensive transversely within and fastened to the outer skin at and intermediate opposite ends of the chassis respectively, each of said formers having an integral box-section extended longitudinally therethrough, and an elongate sectional inner skin interrupted by the intermediate former and with its opposite side margins fastened to the outer skin and with the separated end margins of the sections thereof fastened to the said longitudinally extended box-sections of adjacently spaced formers and extending therebetween establishing a continuous box-section rail.

6. A stressed skin car chassis comprising, an elongate cross sectionally contoured and substantially continuous outer skin, more than two rigid longitudinally spaced and transversely disposed tubular cross sectioned formers within and fastened to the outer skin at and intermediate opposite ends of the chassis respectively, each of said formers having an integral box-section at each opposite side of the chassis and extending longitudinally therethrough, and an elongate sectional inner skin at each opposite side of the chassis and each of which is fastened to the outer skin by its opposite margins and is interrupted by the intermediate former and with its separated end margins fastened to the box-sections of adjacently spaced formers and extending therebetween establishing a box-section rail coextensive with each opposite side of the chassis.

7. A stressed skin car chassis of open topped "canoe" configuration and comprising, an elongate cross sectionally contoured and substantially continuous outer skin, more than two longitudinally spaced transversely disposed tubular cross sectioned hoop-shaped formers continuously coextensive transversely within and fastened to the outer skin, the intermediate former having an integral box-section extended longitudinally therethrough, and an elongate sectional inner skin interrupted by the intermediate former and with its opposite side margins fastened to the outer skin and cross sectionally contoured to the cross sectional configuration of the box-sections and with the separated end margins of the sections fastened to the said longitudinally extended box section and to the adjacently spaced formers and extending therebetween forming a continuous box-section rail 8. A stressed skin car chassis of open topped "canoe" configuration and comprising, an elongate cross sectionally contoured outer skin, more than two longitudinally spaced transversely disposed and tubular cross sectioned hoop-shaped formers within and fastened to the outer skin, each of said formers having an integral box-section at each opposite side of the chassis and extending longitudinally therethrough, and an elongate sectional inner skin interrupted by the intermediate former at each opposite side of the chassis and with its opposite side margins fastened to the outer skin and cross sectionally contoured to the cross sectional configuration of the box-sections and with the separated end margins of the sections fastened to the said box sections of adjacently spaced formers and extending therebetween forming a continuous box-section rail at each opposite side of the chassis.

References Cited by the Examiner

UNITED STATES PATENTS

| 2,007,134 | 7/1935 | Rosenberg. | |
| 2,612,964 | 10/1952 | Hobbs | 296—28 X |
| 3,022,105 | 2/1962 | Tjaarda | 296—28 |

FOREIGN PATENTS

| 511,518 | 8/1939 | Great Britain. |
| 757,443 | 9/1956 | Great Britain. |

BENJAMIN HERSH, *Primary Examiner.*

E. E. PORTER, J. A. PEKAR, *Assistant Examiners.*